(12) United States Patent
Nakamuro (10) Patent No.: US 6,390,481 B1
(45) Date of Patent: May 21, 2002

(54) LOCKING CHUCK

(75) Inventor: Daijiro Nakamuro, Hyougo Prefecture (JP)

(73) Assignee: Power Tool Holders Incorporated, Christiana, DE (US)

( * ) Notice: Subject to any disclaimer, the term of this patent is extended or adjusted under 35 U.S.C. 154(b) by 0 days.

(21) Appl. No.: 09/523,427

(22) Filed: Mar. 10, 2000

(51) Int. Cl.⁷ .............................................. B23B 31/12
(52) U.S. Cl. .......................... 279/62; 279/140; 279/902
(58) Field of Search ............................ 279/60–65, 140, 279/902

(56) References Cited

U.S. PATENT DOCUMENTS

| | | |
|---|---|---|
| 573,189 A | 12/1896 | Vogel |
| 4,213,623 A | 7/1980 | Rohm .......................... 279/1 C |
| 4,302,021 A | 11/1981 | Rohm .......................... 279/60 |
| 4,583,751 A | 4/1986 | Rohm .......................... 279/1 K |
| 4,840,387 A | 6/1989 | McCarthy |
| 5,044,643 A | 9/1991 | Nakamura .................... 279/60 |
| 5,125,673 A | 6/1992 | Huff et al. |
| 5,145,192 A | 9/1992 | Rohm .......................... 279/62 |
| 5,145,193 A | 9/1992 | Rohm .......................... 279/62 |
| 5,172,923 A | 12/1992 | Nakamura |
| 5,215,317 A | 6/1993 | Jordan et al. |
| 5,232,230 A | 8/1993 | Lin |

(List continued on next page.)

FOREIGN PATENT DOCUMENTS

| | | |
|---|---|---|
| DE | 4238503 C1 | 11/1993 |
| DE | 19506708 C1 | 3/1996 |
| DE | 29600727 U1 | 4/1996 |
| DE | 4438991 A1 | 5/1996 |
| EP | 0618029 A1 | 10/1994 |
| EP | 0677348 A1 | 10/1995 |
| EP | 0710518 A2 | 5/1996 |
| EP | 0710519 A2 | 5/1996 |
| EP | 0710520 A2 | 5/1996 |
| EP | 0519412 | 3/1997 |
| FR | 002645056 A | 10/1990 |
| JP | 4365504 | 12/1992 |

*Primary Examiner*—Steven C. Bishop
(74) *Attorney, Agent, or Firm*—Nelson Mullins Riley & Scarborough, LLP (57) ABSTRACT

A chuck includes a generally cylindrical body and a plurality of jaws moveably disposed with respect to the body in communication with the body's axial bore. A generally cylindrical sleeve is rotatably mounted about the body in operative communication with the jaws so rotation of the sleeve in a closing direction moves the jaws towards the axis of the axial bore and rotation of the sleeve in an opening direction moves the jaws away from the axis. A bearing has a first race adjacent the body, a second race adjacent the sleeve and at least one bearing element disposed between the first race and the second race. One of the first race and the second race defines a ratchet. The other of the first race and the second race defines a pawl biased toward the ratchet. The ratchet and the pawl are configured so that when the pawl engages the ratchet, the ratchet and pawl prevent the second race from rotating in the opening direction with respect to the first race.

19 Claims, 5 Drawing Sheets

U.S. PATENT DOCUMENTS

| | | |
|---|---|---|
| 5,234,223 A | 8/1993 | Sakamaki |
| 5,261,679 A | 11/1993 | Nakamura |
| 5,322,303 A | 6/1994 | Nakamura |
| 5,348,317 A | 9/1994 | Steadings et al. |
| 5,348,318 A | 9/1994 | Steadings et al. |
| 5,411,275 A | 5/1995 | Huff et al. |
| 5,431,419 A | 7/1995 | Mack |
| 5,458,345 A | 10/1995 | Amyot |
| 5,499,829 A | 3/1996 | Rohm |
| 5,499,830 A | 3/1996 | Schnizler |
| 5,501,473 A | 3/1996 | Barton et al. |
| 5,615,899 A | 4/1997 | Sakamaki |
| 5,741,016 A | 4/1998 | Barton et al. |
| 5,775,704 A | 7/1998 | Wilson et al. |
| 5,816,582 A | 10/1998 | Steadings et al. |
| 5,816,583 A | 10/1998 | Middleton |
| 5,826,888 A | 10/1998 | Weaver et al. |
| 5,829,761 A * | 11/1998 | Rohm .......................... 279/62 |
| 5,882,153 A | 3/1999 | Mack et al. |
| 5,913,524 A | 6/1999 | Barton |
| 5,957,469 A | 9/1999 | Miles et al. |
| 6,260,856 B1 * | 7/2001 | Temple-Wilson ............ 279/62 |

* cited by examiner

LOCKING CHUCK

BACKGROUND OF THE INVENTION

The present invention relates generally to chucks for use with drills or with electric or pneumatic power drivers. More particularly, the present invention relates to a chuck of the keyless type which may be tightened or loosened by hand or actuation of the driver motor.

Both hand and electric or pneumatic tool drivers are well known. Although twist drills are the most common tools on such drivers, the tools may also comprise screw drivers, nut drivers, burrs, mounted grinding stones, and other cutting or abrading tools. Since the tool shanks may be of varying diameter or of polygonal cross section, the device is usually provided with a chuck adjustable over a relatively wide range. The chuck may be attached to the driver by a threaded or tapered bore.

A variety of chucks have been developed in the art. In an oblique jawed chuck, a chuck body includes three passageways disposed approximately 120° apart from each other. The passageways are configured so that their center lines meet at a point along the chuck axis forward of the chuck. The passageways constrain three jaws which are moveable in the passageways to grip a cylindrical or polygonal tool shank displaced approximately along the chuck center axis. The chuck includes a nut that rotates about the chuck center and that engages threads on the jaws so that rotation of the nut moves the jaws in either direction within the passageways. The body is attached onto the drive shaft of a driver and is configured so that rotation of the body in one direction with respect to the nut forces the jaws into gripping relationship with the tool shank, while rotation in the opposite direction releases the gripping relationship. The chuck may be keyless if it is rotated by hand. Examples of such chucks are disclosed in U.S. Pat. Nos. 5,125,673 and 5,193,824, commonly assigned to the present assignee and the entire disclosures of which are incorporated by reference herein. Various configurations of keyless chucks are known in the art and are desirable for a variety of applications.

SUMMARY OF THE INVENTION

The present invention recognizes and addresses the foregoing considerations, and others, of prior art constructions and methods.

Accordingly, it is an object of the present invention to provide an improved chuck.

This and other objects are achieved by a chuck for use with a manual or powered driver having a rotatable drive shaft. The chuck includes a generally cylindrical body having a nose section and a tail section. The tail section is configured to rotate with the drive shaft, and the nose section has an axial bore formed therein. A plurality of jaws are movably disposed with respect to the body in communication with the axial bore. A generally cylindrical sleeve is rotatably mounted about the body in operative communication with the jaws so that rotation of the sleeve in a closing direction moves the jaws toward the axis of the axial bore and rotation of the sleeve in an opening direction moves the jaws away from the axis. A bearing has a first race adjacent the body, a second race adjacent the sleeve and at least one bearing element disposed between the first race and the second race. One of the first race and the second race defines a ratchet. The other of the first race and the second race defines a pawl biased toward the ratchet. The ratchet and the pawl are configured so that when the pawl engages the ratchet, the ratchet and the pawl prevent the second race from rotating in the opening direction with respect to the first race.

The accompanying drawings, which are incorporated in and constitute a part of this specification, illustrate one embodiment of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
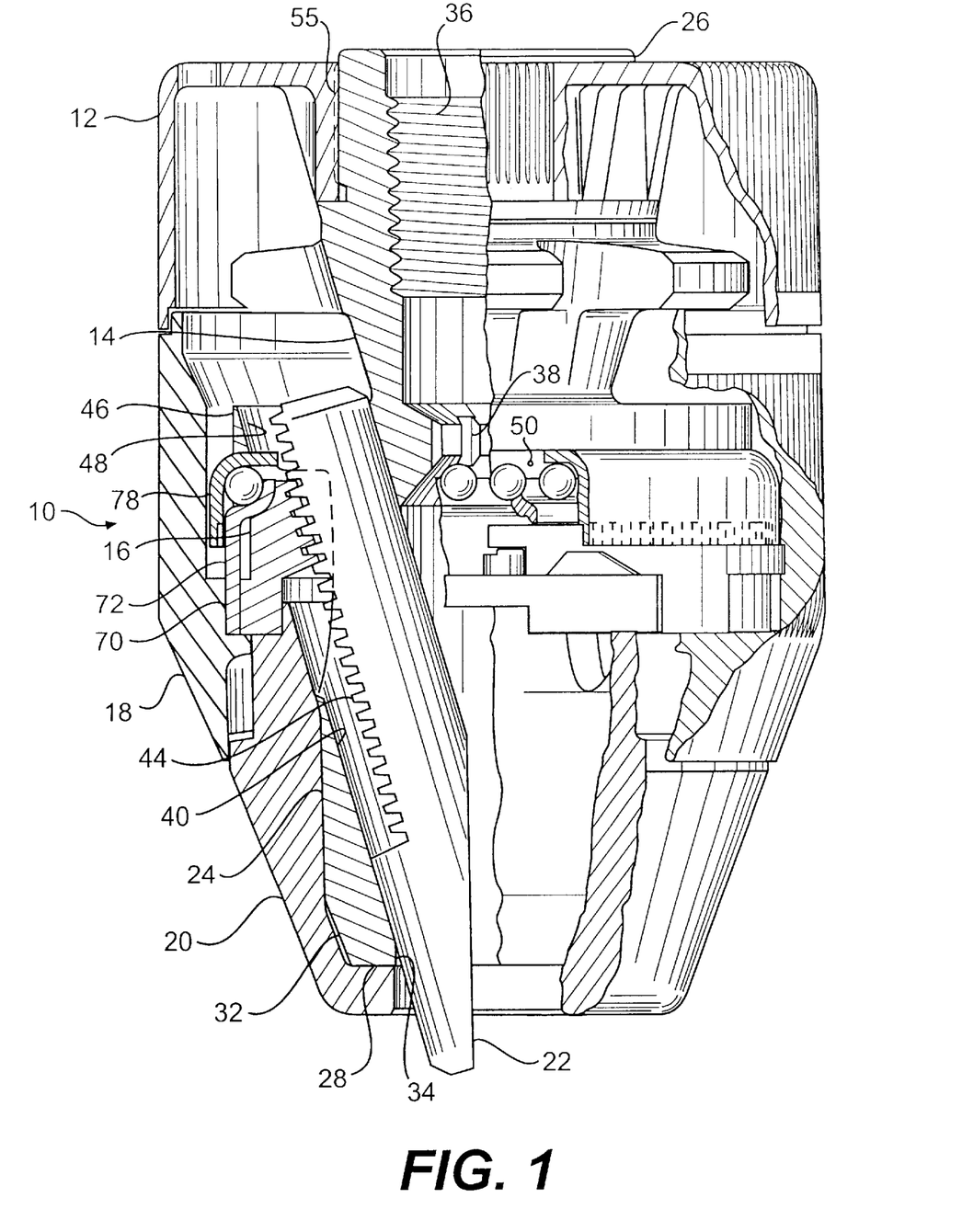
FIG. 1 is a longitudinal view, partly in section, of a chuck in accordance with an embodiment of the present invention.
Figure 2:
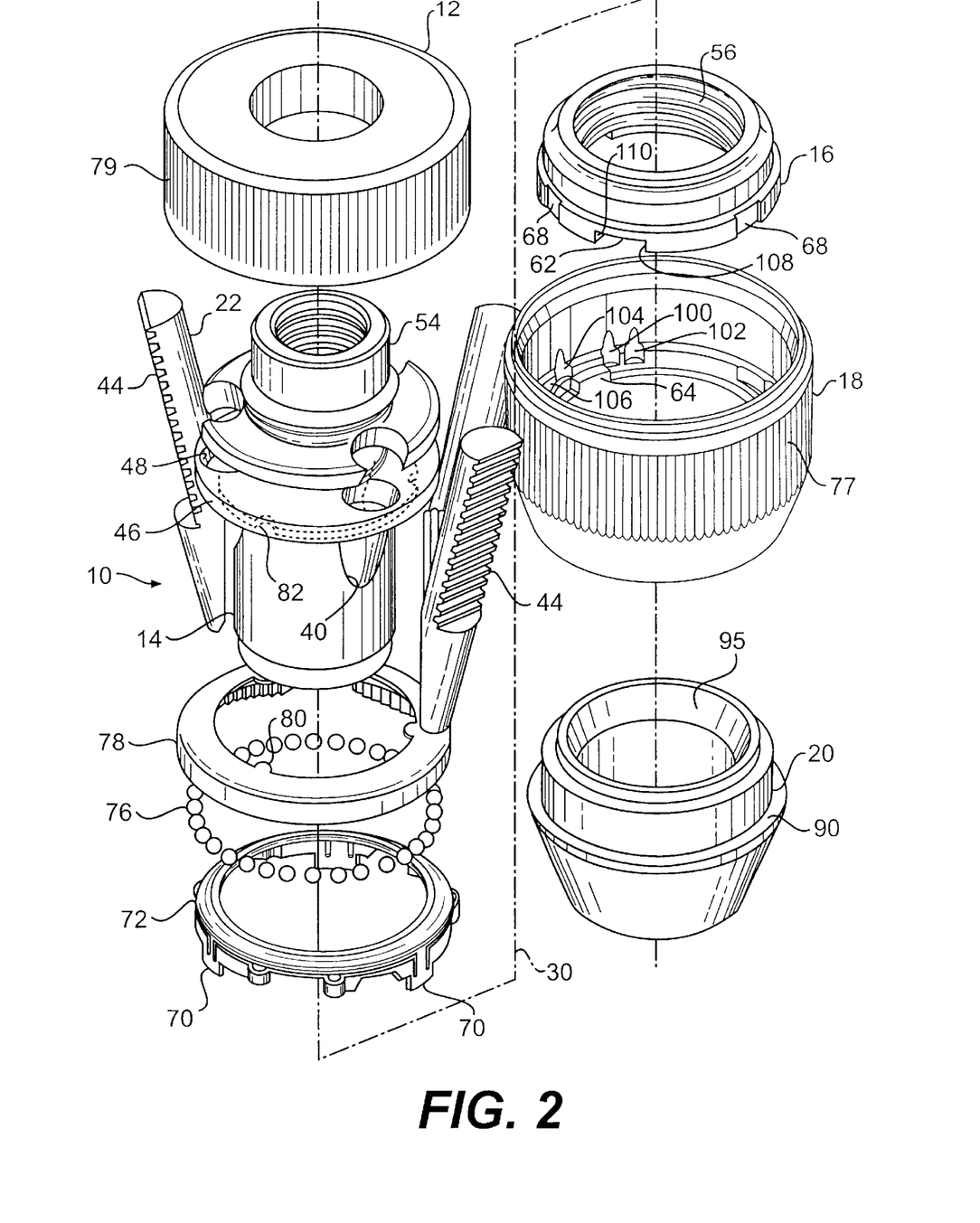
FIG. 2 is an exploded view of a chuck as shown in FIG. 1.

Referring to FIGS. 1 and 2, a chuck 10 includes a body 14, a nut 16, a front sleeve 18, a nose piece 20 and a plurality of jaws 22. Body 14 is generally cylindrical in shape and comprises a nose or forward section 24 and a tail or rearward section 26. Nose section 24 has a front face 28 transverse to the longitudinal center axis 30 of body 14 and a tapered surface 32 at its forward end. The nose section defines an axial bore 34 that is dimensioned somewhat larger than the largest tool shank that the tool is designed to accommodate. A threaded bore 36 is formed in tail section 26 and is of a standard size to mate with the drive shaft of a powered or hand driver (not shown). The bores 34, 36 may communicate at a central region 38 of body 14. While a threaded bore 36 is illustrated, such bore could be replaced with a tapered bore of a standard size to mate with a tapered drive shaft. Furthermore, body 14 may be formed integrally with the drive shaft.

Body 14 defines three passageways 40 to accommodate three jaws 22. Each jaw is separated from the adjacent jaw by an arc 30 of approximately 120°. The axes of passageways 40 and jaws 22 are angled with respect to the chuck center axis 30 such that each passageway axis travels through axial bore 34 and intersects axis 30 at a common point ahead of the chuck body.

Figure 5:
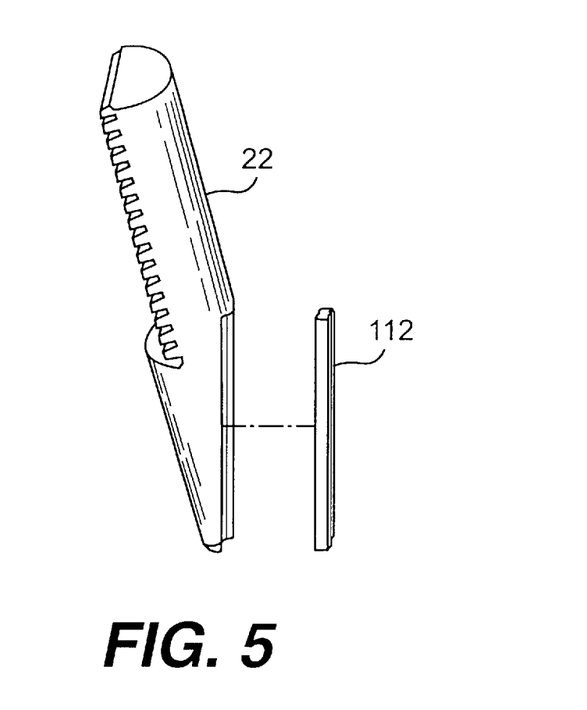
FIG. 5 is a perspective view of a chuck jaw of the chuck as shown in FIG. 1.

The jaws form a grip that moves radially toward and away from the chuck axis to grip a tool, and each jaw 22 has a tool engaging face 42 generally parallel to the axis of chuck body 14. Threads 44, formed on the jaw's opposite or outer surface, may be constructed in any suitable type and pitch. As shown in FIG. 5, each jaw 22 may be formed with carbide inserts 112 pressed into its tool-engaging surface.

As illustrated in FIGS. 1 and 2, body 14 includes a thrust ring 46 that, in a preferred embodiment, may be integral with the body. It should be understood, however, that thrust ring 46 and body 14 may be separate components. Thrust ring 46 includes a plurality of jaw guideways 48 formed around its circumference to permit retraction of jaws 22 therethrough and also includes a ledge portion 50 to receive a bearing assembly as described below.

Body tail section 26 includes a knurled surface 54 that receives an optional rear sleeve 12 in a press fit at 55. Rear sleeve 12 could also be retained by press fit without knurling, by use of a key or by crimping, staking, riveting, threading or any other suitable securing mechanism. Further, the chuck may be constructed with a single sleeve having no rear sleeve.

Nose piece 20 retains nut 16 against forward axial movement. The nose piece is press fit to body nose section 24. It should be understood, however, that other methods of axially securing the nut on the body may be used. For example, the nut may be a two-piece nut held on the body within a circumferential groove on the outer circumference of the body. Nose piece 20 may be coated with a non-ferrous metallic coating to prevent rust and to enhance its appearance. Examples of suitable coatings include zinc or nickel, although it should be appreciated that any suitable coating could be utilized.

The outer circumferential surface of front sleeve 18 may be knurled or may be provided with longitudinal ribs 77 or other protrusions to enable the operator to grip it securely. In like manner, the circumferential surface of rear sleeve 12, if employed, may be knurled or ribbed as at 79 if desired.

Front sleeve 18 is secured from movement in the forward axial direction by an annular shoulder 90 on nose piece 20. A frustoconical section 95 at the rearward end of the nose piece facilitates movement of jaws 22 within the chuck.

The front and rear sleeves may be molded or otherwise fabricated from a structural plastic such as polycarbonate, a filled polypropylene, for example a glass filled polypropylene, or a blend of structural plastic materials. Other composite materials such as, for example, graphite filled polymerics may also be suitable in certain environments. As should be appreciated by one skilled in the art, the materials for which the chuck of the present invention is fabricated will depend on the end use of the chuck, and the above materials are provided by way of example only.

Nut 16 has threads 56 for mating with jaw threads 44. Nut 16 is positioned about the body in engagement with the jaw threads so that when the nut is rotated with respect to body 14, the jaws will be advanced or retracted depending on the nut's rotational direction.

Figure 3:
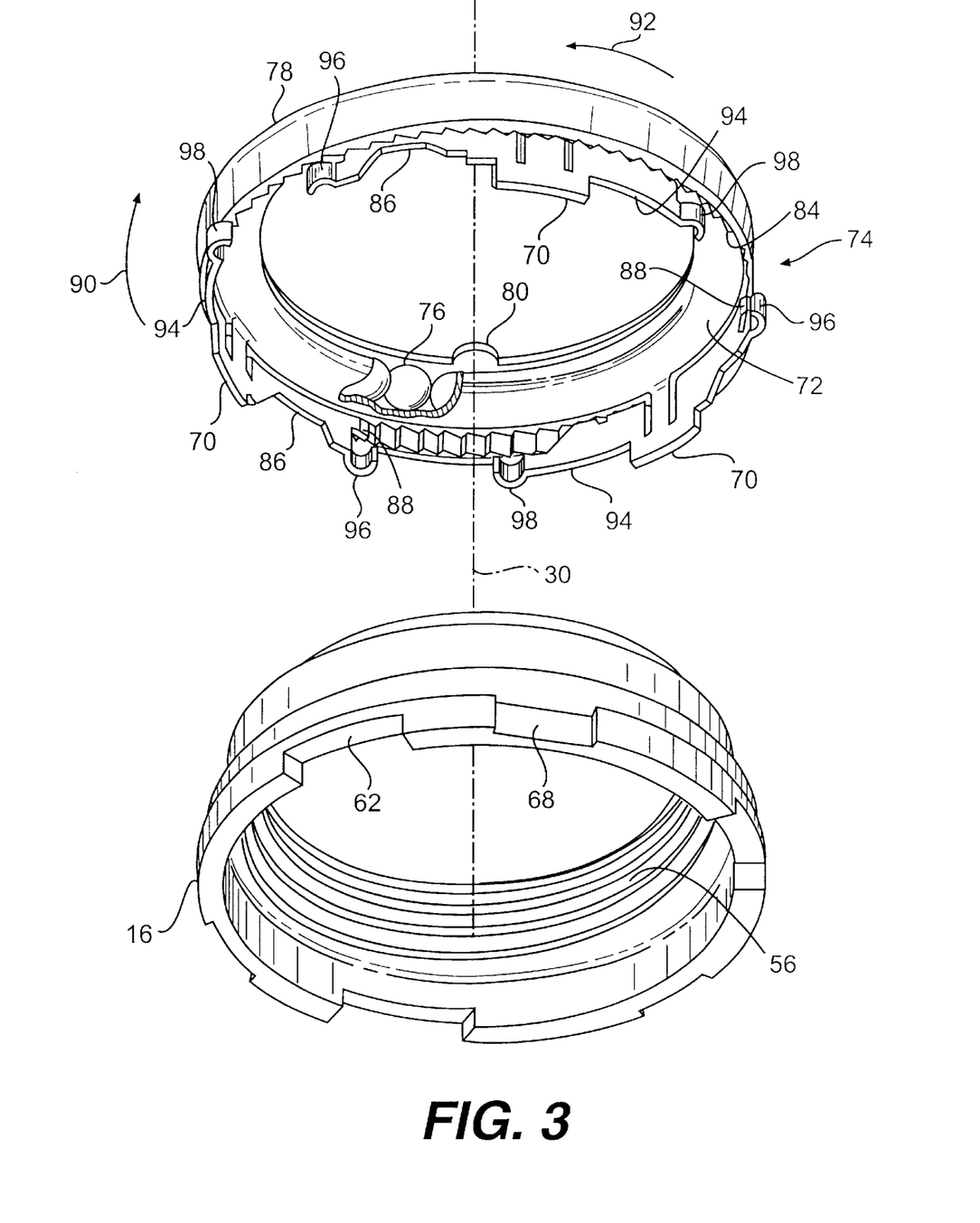
FIG. 3 is an exploded view of the bearing and nut of the chuck as shown in FIG. 1.

As illustrated in FIG. 3, the nut's forward axial face includes recesses 62 that receive respective drive dogs 64 (FIG. 2) extending from the inner surface of front sleeve 18. The angular width of the drive dogs is less than that of the recesses, resulting in a slight range of relative rotational movement, for example between 6° and 10° between the nut and the front sleeve.

Nut 16 also defines a plurality of grooves formed as flats 68 about the nut's outer circumference. Flats 68 receive respective tabs 70 extending forward from an inner race 72 of a bearing assembly 74. The engagement of tabs 70 and flats 68 rotationally fix the inner race to the nut, although it should be understood that there may be a slight rotational tolerance between the two.

Inner race 72 receives a plurality of bearing elements, in this case bearing balls, 76 disposed between it and an outer race 78 seated on thrust ring ledge 50 (FIG. 1). Outer race 78 is rotationally fixed to body 14 by a plurality of tabs 80 received in corresponding grooves 82 in the thrust ring ledge.

Outer race 78 also includes a ratchet. In the illustrated embodiment, the ratchet is formed by a plurality of sawtooth-shaped teeth 84 disposed about the inner circumferential surface of the outer race. A first pawl 86 extends from one side of each tab 70 and is biased radially outward from the inner race, thereby urging a distal end 88 of each pawl 86 toward the outer race ratchet.

Each tooth 84 has a first side with a slope approaching 90°. The second side has a lesser slope. Pawl 86 is defectable and is generally disposed in alignment with the slope of the second side. Thus, rotation of inner race 72 in a direction 90 with respect to outer race 78 moves pawl distal ends 88 repeatedly over teeth 84, causing a clicking sound as ends 88 fall against each subsequent tooth's second side. This configuration of teeth 84 and pawl 86, however, prevents the inner race's rotation in an opposite direction 92. Application of rotational force to the inner race in this direction forces distal ends 88 into the steep-sloped first sides of teeth 84. Since Pawl 86 is generally perpendicular to the first sides, it does not deflect inward to permit rotation.

As discussed below, direction 90 corresponds to the chuck's closing direction, while direction 92 corresponds to the chuck's opening direction. Accordingly, when pawls 86 engage ratchet teeth 84, the teeth permit the inner race's movement in the chuck's opening direction but prevent its movement in the closing direction.

A second deflectable pawl 94 extends to the other side of each tab 70. Like pawls 86, each pawl 94 is biased radially outward. Unlike pawls 86, however, pawls 94 do not engage the outer race ratchet.

Figure 4A:
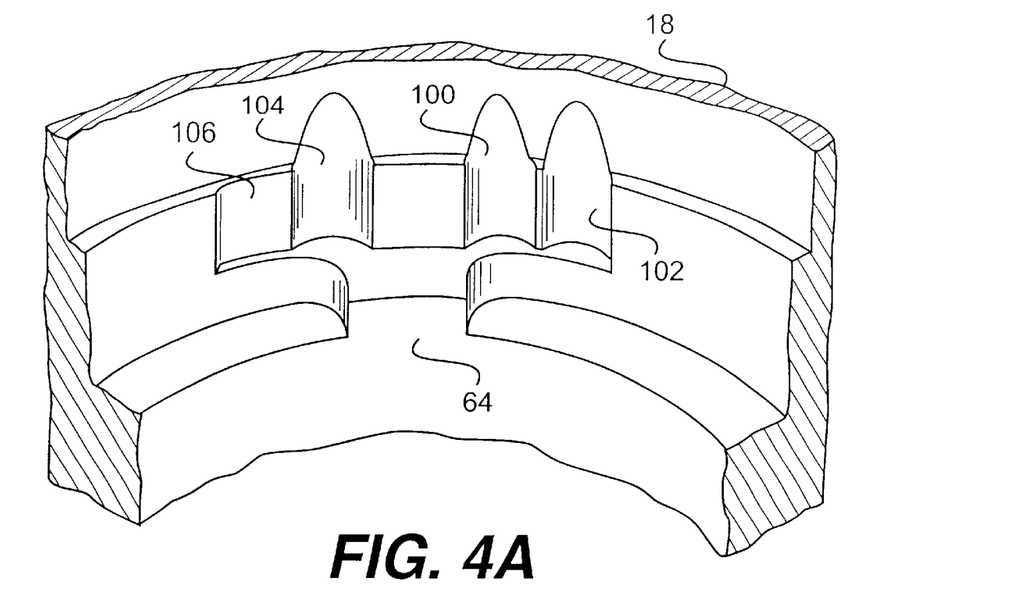
FIG. 4A is a partial perspective view of the sleeve of the chuck as shown in FIG. 1.

Pawls 86 and 94 include tabs 96 and 98 at their distal ends. Referring also to FIG. 4A, an inner circumferential surface of sleeve 18 defines first and second recesses 100 and 102. During the chuck's operation, each tab 98 is received in one of these recesses, depending on the sleeve's rotational position with respect to the nut as discussed in more detail below. The sleeve also defines a third recess 104 and a cam surface 106. Also depending on the sleeve's rotational position, each tab 96 is received either by the cam surface or by recess 104. The sleeve includes a pair of recesses 100, 102 for each tab 98 and a recess 104 and cam surface 106 for each tab 96.

Figure 4B:
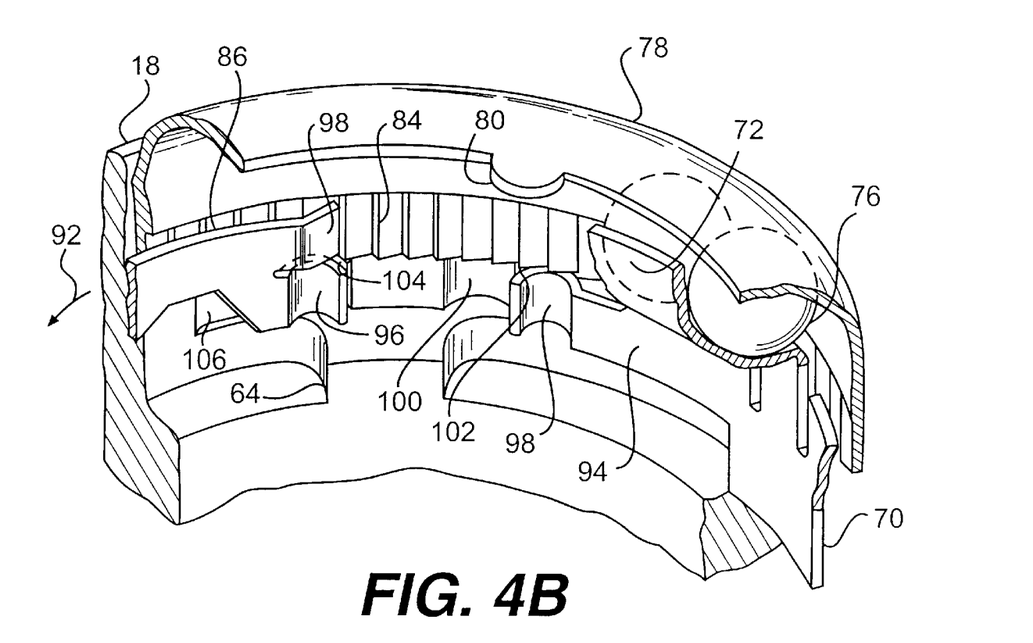
FIG. 4B is a partial perspective view of the bearing and sleeve of the chuck as shown in FIG. 1.
Figure 4C:
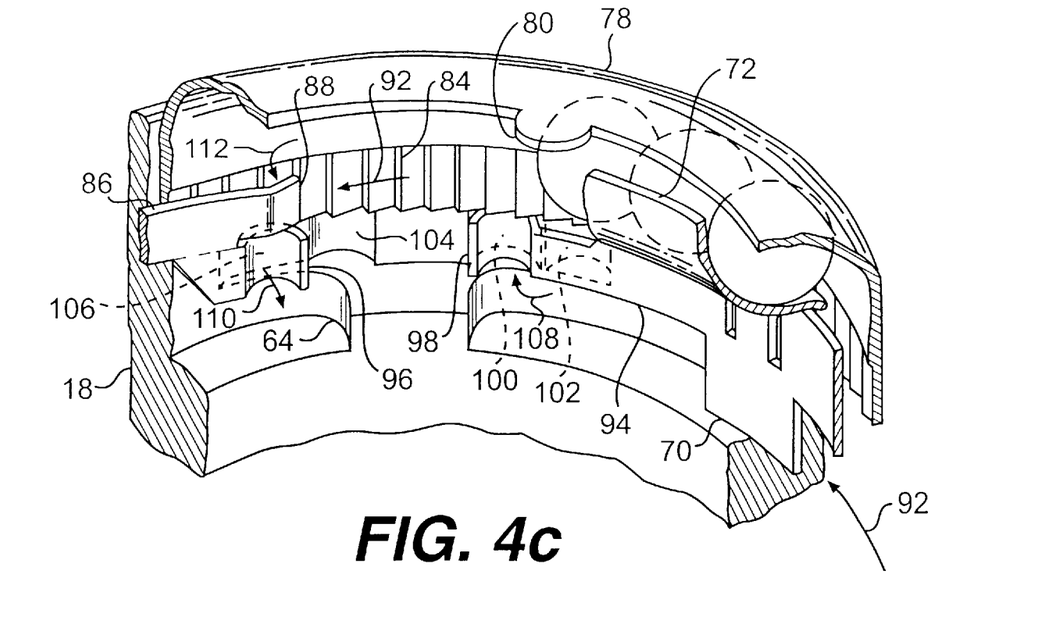
FIG. 4C is a partial perspective view of the bearing and sleeve of the chuck as shown in FIG. 1.

FIG. 4C illustrates the disposition of pawls 86 and 94 when sleeve 18 is in a first of two positions with respect to nut 16 (FIG. 2), while FIG. 4B illustrates these components when the sleeve is in a second position with respect to the nut. For ease of illustration, both figures omit the nut. However, referring to FIG. 2 and to the sleeve's second position as shown in FIG. 4B, each drive dog 64 is disposed against or adjacent to a side 108 of the gap 62 in which is it received. Each of the sleeve's recesses 102 receives tab 98 of one of the pawls 94, and each recess 104 receives tab 96 of one of the pawls 86. Accordingly, the distal end 88 of each pawl 86 engages ratchet teeth 84, and inner race 72 can rotate only in direction 92 with respect to outer race 78.

Referring now to FIG. 4C, when inner race 72 moves in opening direction 92 with respect to the outer race, each tab 98 moves out of its recess 102 and into its recess 100, as indicated by arrow 108. Each tab 96 rides up and out of its recess 104 onto its cam surface 106, as indicated by arrow 110. As indicated by arrow 112, this pushes each deflectable tab 86 radially inward, thereby disengaging distal ends 88 from ratchet teeth 84. Thus, the inner race is free to rotate with respect to the outer race.

As described in more detail below, when sleeve 18 rotates in direction 92 so that the inner race moves from the position shown in FIG. 4B to the position shown in FIG. 4C, drive dogs 64 move within grooves 62 of nut 16 (FIG. 2) so that each drive dog is against or immediately adjacent to a side 110 of the groove.

In operation, and referring to FIGS. 2, 3, 4B and 4C, nut grooves 62 receive drive dogs 64 when the chuck is between fully opened and fully closed positions so that the drive dogs are adjacent groove sides 108. Inner race 72 is disposed with respect to outer race 78 so that tabs 96 and 98 are received by cam surface 106 and recess 100, respectively. That is, sleeve 18 is in the first position with respect to the nut. In this condition, tabs 98 and recesses 100 rotationally fix inner race 72 to sleeve 18. Since inner race 72 is rotationally fixed to nut 16 by tabs 70 and flats 68, an operator rotating sleeve 18 rotationally drives the nut through inner race 72, thereby opening or closing the jaws. When the operator rotates the sleeve/bearing inner race/nut in the closing direction (indicated by arrow 90 in FIG. 3) to the point that the jaws tighten onto a tool shank, the nut is urged rearward up the jaw threads, thereby pushing the nut against inner race 72, bearing elements 76, outer race 78 and thrust ring 46. The rearward force creates a frictional lock between the nut and inner race 72 that further rotationally fixes two components.

The wedge between the nut threads and jaw threads increasingly resists the nut's rotation. When the operator continues to rotate sleeve 18, and the resistance overcomes the hold provided by tabs 98 in recesses 100, sleeve 18 rotates with respect to nut 16 and inner bearing race 72. This moves drive dogs 64 from sides 108 of grooves 62 to sides 110 and pushes tabs 98 out of recesses 100 into recesses 102. Simultaneously, cam surfaces 106 rotate away from tabs 96 so that the tabs are released into recesses 104, thereby engaging distal ends 88 of pawls 86 with ratchet teeth 84, as shown in FIG. 4B. At this point, inner race 72, and therefore nut 16, is rotationally locked to outer race 78, and therefore body 14, against rotation in the chuck's opening direction. That is, the nut is rotationally locked to the chuck body in the opening direction. Since the nut's rotation with respect to the body is necessary to open the chuck, this prevents inadvertent opening during use.

Inner race 72, and therefore nut 16, may, however, still rotate with respect to outer race 78, and therefore body 14, in the chuck's closing direction. During such rotation, sleeve 18 drives nut 16 through drive dogs 64 against groove sides 110, as well as through inner race 72. This continues to tighten the chuck and, as described above, produces a clicking sound to notify the operator that the chuck is in a fully tightened position.

To open the chuck, the operator rotates sleeve 18 in the opposite direction. Sleeve 18 transfers this torque to inner race 72 at the engagement of tabs 96 and 98 in recesses 104 and 102, respectively. Because pawls 86 engage outer race 78, which is rotationally fixed to the body, through the ratchet teeth, the inner race cannot rotate with the sleeve. Thus, upon application of sufficient torque in the opening direction, sleeve 18 moves with respect to the inner race and the nut. This moves tabs 96 back up onto cam surfaces 106, thereby disengaging pawls 86 from ratchet teeth 84. Tabs 98 move from recesses 102 into recesses 100, and drive dogs 64 move from sides 110 to sides 108 of grooves 62. Thus, the sleeve moves to its first position with respect to the nut, as shown in FIG. 4C, and the inner race and nut, are free to rotate with respect to the outer race and chuck body. Accordingly, further rotation of sleeve 18 in the opening direction moves jaws 22 away from the chuck axis, thereby opening the chuck.

It should be understood that the embodiment illustrated in the figures is provided by way of explanation only and that the present invention may be realized in any suitable form. For example, the pawls and ratchet may be formed in any suitable configuration. The present invention may be used in a variety of chuck configurations whereby a bearing having a ratchet configuration is disposed between a sleeve, for example a nut or other suitable configuration, and the chuck body. For example, a chuck may include a body, a nut that is rotationally fixed to and axially movable with respect to the body, and an outer sleeve that threadedly engages the nut so that rotation of the sleeve moves the nut axially on the body. The jaws may be axially fixed to the nut and received in body passageways so that the nut's axial movement drives the jaws toward and away from the chuck axis. In this configuration, the outer sleeve may be permitted to rotate over a limited angular distance with respect to a second sleeve. A bearing including a ratchet configuration as discussed above may be disposed between the second sleeve and the chuck body. Still further, depending on the chuck's configuration, the pawls and ratchet may be interchanged as appropriate.

While one or more preferred embodiment of the present invention have been described above, it should be understood that any and all equivalent realizations of the present invention are included within the scope and spirit thereof. Thus, the depicted embodiment(s) are presented by way of example only and are not intended as limitations on the present invention. It should be understood that aspects of the various one or more embodiments may be interchanged both in whole or in part. Therefore, it is contemplated that any and all such embodiments are included in the present invention as may be fall within the literal or equivalent scope of the appended claims.

What is claimed is:

1. A chuck for use with a manual or powered driver having a rotatable drive shaft, said chuck comprising:

a generally cylindrical body having a nose section and a tail section, said tail section being configured to rotate with said drive shaft and said nose section having an axial bore formed therein;

a plurality of jaws movably disposed with respect to said body in communication with said axial bore;

a sleeve rotatably mounted about said body in operative communication with said jaws so that rotation of said sleeve in a closing direction moves said jaws toward the axis of said axial bore and rotation of said sleeve in an opening direction moves said jaws away from said axis; and a bearing having a first race adjacent said body, a second race adjacent said sleeve and at least one bearing element disposed between said first race and said second race, wherein one of said first race and said second race defines a ratchet, wherein the other of said first race and said second race defines a pawl biased toward said ratchet and wherein said ratchet and said pawl are configured so that when said pawl engages said ratchet, said ratchet and pawl prevent said second race from rotating in said opening direction with respect to said first race.

2. The chuck as in claim 1, wherein said sleeve includes a first sleeve and a second sleeve and wherein said first sleeve rotationally drives said second sleeve but is movable with respect to said second sleeve between a first position and a second position.

3. The chuck as in claim 2, wherein said first sleeve defines a cam surface disposed with respect to said pawl so that said cam surface disengages said pawl from said ratchet when said first sleeve is in said first position with respect to said second sleeve and releases said pawl to engage said ratchet when said first sleeve is in said second position with respect to said second sleeve.

4. The chuck as in claim 1, wherein said sleeve is an annular nut having threads formed thereon in engagement with threads on said jaws so that rotation of said nut about said body moves said jaws toward or away from said axis.

5. The chuck as in claim 4, wherein said pawl is deflectable and wherein said pawl and said ratchet are configured so that when said pawl engages said ratchet, said pawl and ratchet permit said second race to rotate in said opening direction with respect to said first race but prevent said second race from rotating in said closing direction with respect to said first race.

6. The chuck as in claim 4, including an outer sleeve in operative communication with said nut so that said outer sleeve rotationally drives said nut but is rotatable with respect to said nut between a first rotational position and a second rotational position, wherein said outer sleeve defines a cam surface disposed with respect to said pawl so that said cam surface disengages said pawl from said ratchet when said outer sleeve is in said first position with respect to said nut and releases said pawl to engage said ratchet when said outer sleeve is in said second position with respect to said nut.

7. A chuck for use with a manual or powered driver having a rotatable drive shaft, said chuck comprising:
   a generally cylindrical body having a nose section and a tail section, said tail section being configured to rotate with said drive shaft and said nose section having an axial bore formed therein and a plurality of passageways formed therethrough and intersecting said axial bore;
   a plurality of jaws movably disposed in said passageways;
   a generally cylindrical sleeve rotatably mounted about said body;
   a nut rotatably mounted about said body and in operative communication with said jaws so that rotation of said nut in a closing direction moves said jaws toward the axis of said axial bore and rotation of said nut in an opening direction moves said jaws away from said axis; and
   a bearing having a first race adjacent said body, a second race adjacent said nut and a plurality of bearing elements disposed between said first race and said second race, wherein said first race defines a ratchet, wherein said second race defines a deflectable first pawl biased toward said ratchet and wherein said ratchet and said first pawl are configured so that when said first pawl engages said ratchet, said ratchet and first pawl permit said second race to rotate in said opening direction with respect to said first race but prevent said second race from rotating in said closing direction with respect to said first race,
   wherein said sleeve is in operative communication with said nut so that said sleeve rotationally drives said nut but is rotatable with respect to said nut between a first rotational position and a second rotational position, and
   wherein said sleeve defines a cam surface disposed with respect to said first pawl so that said cam surface disengages said first pawl from said ratchet when said sleeve is in said first position with respect to said nut and releases said first pawl to engage said ratchet when said sleeve is in said second position with respect to said nut.

8. The chuck as in claim 7, wherein said second race is rotationally fixed with respect to said body.

9. The chuck as in claim 8, wherein said second race includes a plurality of tabs extending therefrom and received by corresponding grooves in said body.

10. The chuck as in claim 7, wherein said first race is rotationally fixed to said nut.

11. The chuck as in claim 10, wherein said first race includes a dog extending therefrom into a corresponding groove in said nut.

12. The chuck as in claim 10, wherein said sleeve rotationally drives said nut through said first race.

13. The chuck as in claim 12, wherein said first race includes a second deflectable pawl, wherein said second pawl is biased toward an inner circumferential surface of said sleeve and wherein said inner circumferential surface defines two recesses disposed with respect to said first race so that said second pawl is received by a first said recess when said sleeve is in said first position and so that said second pawl is received by a second said recess when said sleeve is in said second position.

14. The chuck as in claim 13, wherein said inner circumferential surface defines said cam surface and defines a third recess disposed adjacent said cam surface and with respect to said first pawl so that said first pawl engages said cam surface when said sleeve is in said first position and so that said first pawl is received by said third recess when said sleeve is in said second position.

15. The chuck as in claim 7, wherein an inner circumferential surface of said sleeve defines said cam surface and defines a recess disposed adjacent said cam surface and with respect to said first pawl so that said first pawl engages said cam surface when said sleeve is in said first position and so that said first pawl is received by said recess when said sleeve is in said second position.

16. The chuck as in claim 7, including a plurality of said first pawls and a corresponding plurality of said cam surfaces.

17. A chuck for use with a manual or powered driver having a rotatable drive shaft, said chuck comprising:
   a generally cylindrical body having a nose section and a tail section, said tail section being configured to rotate with said drive shaft and said nose section having an axial bore formed therein and a plurality of passageways formed therethrough and intersecting said axial bore;
   a plurality of jaws movably disposed in said passageways;
   a generally cylindrical sleeve rotatably mounted about said body;

a nut rotatably mounted about said body and in operative communication with said jaws so that rotation of said nut in a closing direction moves said jaws toward the axis of said axial bore and rotation of said nut in an opening direction moves said jaws away from said axis; and a bearing having a first race rotationally fixed to said body, a second race rotationally fixed to said nut and a plurality of bearing elements disposed between said first race and said second race, wherein said first race defines a ratchet, wherein said second race defines a deflectable first pawl biased toward said ratchet and wherein said ratchet and said first pawl are configured so that when said first pawl engages said ratchet, said ratchet and first pawl permit said second race to rotate in said opening direction with respect to said first race but prevent said second race from rotating in said closing direction with respect to said first race, wherein said sleeve is in operative communication with said nut so that said sleeve rotationally drives said nut but is rotatable with respect to said nut between a first rotational position and a second rotational position, and wherein said sleeve defines a cam surface disposed with respect to said first pawl so that said cam surface disengages said first pawl from said ratchet when said sleeve is in said first position with respect to said nut and releases said first pawl to engage said ratchet when said sleeve is in said second position with respect to said nut.

18. The chuck as in claim 17, wherein said first race includes a second deflectable pawl, wherein said second pawl is biased toward an inner circumferential surface of said sleeve and wherein said inner circumferential surface defines two recesses disposed with respect to said first race so that said second pawl is received by a first said recess when said sleeve is in said first position and so that said second pawl is received by a second said recess when said sleeve is in said second position.

19. The chuck as in claim 18, including a plurality of said first pawls, said second pawls, said cam surfaces and said recesses.

* * * * *

UNITED STATES PATENT AND TRADEMARK OFFICE
CERTIFICATE OF CORRECTION

PATENT NO. : 6,390,481 B1
DATED : May 21, 2002
INVENTOR(S) : Daijiro Nakamura

It is certified that error appears in the above-identified patent and that said Letters Patent is hereby corrected as shown below:

Title page,
Item [75], Inventors, the correct spelling of the last name is -- Nakamura --.

Column 2,
Line 67, after the phrase "by an arc" please delete the number "30".

Signed and Sealed this

Twenty-first Day of June, 2005

JON W. DUDAS
*Director of the United States Patent and Trademark Office*